United States Patent [19]

Moller et al.

[11] Patent Number: 4,983,703

[45] Date of Patent: Jan. 8, 1991

[54] COATING COMPOSITION WITH EXTENDED POT LIFE

[75] Inventors: Dieter Moller; Udo Vorbeck, both of Ascheberg, Fed. Rep. of Germany

[73] Assignee: BASF Lacke & Farben Aktiengesellschaft, Münster, Fed. Rep. of Germany

[21] Appl. No.: 364,427

[22] PCT Filed: Nov. 20, 1987

[86] PCT No.: PCT/EP87/00721

§ 371 Date: Jul. 6, 1989

§ 102(e) Date: Jul. 6, 1989

[30] Foreign Application Priority Data

Nov. 20, 1986 [DE] Fed. Rep. of Germany ....... 3639637

[51] Int. Cl.$^5$ .............................................. C08G 18/30
[52] U.S. Cl. ..................................... 528/49; 427/385.5
[58] Field of Search ......................... 528/49; 427/385.5

[56] References Cited

FOREIGN PATENT DOCUMENTS 0001304 4/1979 European Pat. Off. .
3523971 1/1987 Fed. Rep. of Germany .

*Primary Examiner*—Maurice J. Welsh
*Attorney, Agent, or Firm*—Richard L. Mayer

[57] ABSTRACT

The present invention relates to a coating composition containing an organic solvent, a mixture of a polyhydroxy component (A) and a polyisocyanate component (B), and a pot life extender. The polyhydroxy component has an acid value from 5 to 25 mg of KOH/g, and a mixture consisting of 0.1 to 4.0% by weight, based on the total weight of the coating composition, of a compound having a tertiary amino group or an amide group (C), and of 1 to 15% by weight, based on the total weight of (A) and (B), of a tertiary monoalcohol is used as pot life extender. 2-methyl-2-propanol and 2-methyl-2-butanol are excluded as the tertiary alcohols.

The present invention also relates to the use of the coating compositions in motor car refinishing in particular.

18 Claims, No Drawings

COATING COMPOSITION WITH EXTENDED POT LIFE

The invention relates to a coating composition containing organic solvents, a mixture of a polyhydroxy component (A), and a polyisocyanate component (B), and a pot life extender, and to the use of this coating composition in motor car refinishing in particular.

Two-component polyurethane systems are employed in the automotive industry where they find application for example in motor car refinishing. A shortcoming of these known compositions is that their pot life is so short that a reaction between the two components can occur already while they are being applied to a substrate. This problem becomes even more acute when a catalyst for the polyurethane formation is employed. It therefore becomes desirable for the two-component polyurethane composition to possess an extended pot life and to cure rapidly after being applied to a substrate despite having an extended pot life.

The use of tertiary alcohols as pot life extenders in a system which contains isocyanate groups and hence reactive groups, is known. It is known from EP-B 1,304 that the pot life of a coating composition containing a mixture of a polyhydroxy compound and a polyisocyanate in an organic solvent can be extended by the addition of 2-methyl-2-propanol and/or 2-methyl-2-butanol if at least 0.8 equivalent of the alcohol is used to one equivalent of the polyisocyanate.

In the case of slow-reacting isocyanates in particular, the reaction must be speeded up to ensure that the applied paints crosslink rapidly and are resistant to gasoline. When dimethylethanolamine and dibutyltin dilaurate, for example, were used as catalysts in the crosslinking reaction, no desired acceleration of the crosslinking of the applied film was achieved, even though pot life was reduced to 2 hours.

It is possible to speed up the reaction by introducing carboxyl groups into the polyol components, but this suffers the disadvantage of a severely shortened pot life. A pot life extension of two-component polyurethane systems containing such acid groups by means of tertiary alcohols, as described in EP-B 1,304, is in most cases insufficient.

The object of the present invention was effectively to extend the pot life of the systems consisting of combinations of polyols with carboxyl groups and polyisocyanates.

Surprisingly, the object has been achieved by the coating composition of the type stated at the outset, wherein the polyhydroxy component has an acid value of 5 to 25 mg of KOH/g, and a mixture consisting of 0.1 to 4.0% by weight, based on the total weight of the coating composition, of a compound having a tertiary amino group or an amide group (C), and of 1 to 15% by weight, based on the total weight of the coating composition, of a tertiary monoalcohol (D) is used as pot life extender, 2-methyl-2-propanol and 2-methyl-2-butanol being excluded as the tertiary alcohols.

Suitable polyhydroxy components with an acid value of 5 to 25 mg of KOH/g are hydroxyacrylates, polyester polyols and polyether polyols. The polyhydroxy compounds generally have a hydroxyl value of at least 80.

Examples of suitable hydroxyacrylates are copolymers of styrene, vinyltoluene, acrylic acid, methacrylic acid, esters of maleic acid or fumaric acid, alkyl acrylates and alkyl methacrylates of 1 to 14 carbon atoms in the alkyl radical, such as methyl acrylate, ethyl acrylate, propyl acrylate, butyl acrylate, isopropyl acrylate, isobutyl acrylate, pentyl acrylate, isoamyl acrylate, hexyl acrylate, 2-ethylhexyl acrylate, octyl acrylate, decyl acrylate, dodecyl acrylate, pentyl methacrylate, isoamyl methacrylate, hexyl methacrylate, 2-ethylbutyl methacrylate, octyl methacrylate, decyl methacrylate, dodecyl methacrylate and methyl methacrylate, and copolymers of hydroxyl group-containing esters of acrylic or methacrylic acid, such as hydroxyethyl acrylate, hydroxypropyl acrylate, hydroxybutyl acrylate, hydroxyamyl acrylate, hydroxyhexyl acrylate, hydroxyoctyl acrylate, 2-hydroxypropyl acrylate, 2-hydroxybutyl acrylate, 3-hydroxybutyl acrylate and the corresponding methacrylates. The suitable hydroxyacrylates have preferably a hydroxyl value in the region of 80 to 750.

Examples of suitable polyether polyols are polytetrahydrofurandiol and polypentaneetherdiol as well as branched polyether polyols which are prepared from a polyhydric alcohol and an alkylene oxide, such as ethylene oxide or propylene oxide.

The polyester polyols which are suitable for use, are prepared by polycondensation of dibasic and/or polybasic carboxylic acids, such as adipic acid, maleic acid, phthalic acid, isophthalic acid, terephthalic acid, tetrahydrophthalic acid, trimellitic acid, with dihydric and/or poly-hydric alcohols, such as neopentyl glycol, glycerol, trimethylolpropane and pentaerythritol. The polyester polyols may also contain, condensed within the molecule, monohydric alcohols, such as benzyl alcohol, and/or monobasic carboxylic acids, such as benzoic acid.

The polyisocyanates which can generally have 2 to 4 isocyanate groups per molecule, can be aliphatic, cycloaliphatic or aromatic. Examples of suitable polyfunctional isocyanates are 2,4-toluylenediisocyanate, 2,6-toluylenediisocyanate, 4,4'-diphenylmethanediisocyanate, hexamethylenediisocyanate, 3,5,5-trimethyl-1-isocyanato-3-isocyanatomethylcyclohexane, m-xylylenediisocyanate, p-xylylenediisocyanate, tetramethylenediisocyanate and cyclohexane-1,4- diisocyanate. The polyisocyanates may be attached to prepolymers of higher molecular mass. Examples of such compounds are adducts of toluylenediisocyanate and trimethylolpropane, and the trimers of hexamethylenediisocyanate and of isophoronediisocyanate. A suitable tetraisocyanate is the adduct of one molecule of pentaerythritol and 4 molecules of hexamethylene-1,6-diisocyanate. Mixtures of polyisocyanates can of course also be used.

Examples of suitable solvents are ketones, ethers, esters and hydrocarbons.

In the case of slow-reacting polyisocyanates, an incorporation of reaction-accelerating carboxyl groups is particularly important. It is in these systems in particular that the need for an effective extension of pot life is particularly great. The polyisocyanate component (B) therefore advantageously has exclusively secondary isocyanate groups which react considerably more slowly than primary isocyanate groups. Examples of these are the polyisocyanurate-polyisocyanates of isophoronediisocyanate, the reaction products of 3 mol of isophoronediisocyanate with 1 mol of water and the adducts of 3 mol of isophoronediisocyanate with 1 mol of a triol. Polyisocyanates with tertiary NCO groups can of course also be used.

Substances containing tertiary basic-nitrogen groups have generally an accelerating effect on polyisocyanate-curing systems. It was therefore particularly surprising and not foreseeable that the combination of a compound having a tertiary amino group or an amide group with a tertiary monoalcohol will lead to an effective extension of pot life.

The compound (C) is advantageously selected from the group comprising dimethylacetamide, dimethylcyclohexylamine, N-methylmorpholine, 1-methylpyrrole, methylimidazole and 1-methylpyrrolidine.

The tertiary monoalcohols (D) have advantageously an evaporation value below 60. It is particularly advantageous if the tertiary monoalcohols (D) have a flash point above 21° C.

1-Methoxy-tert.-butanol-2 (CAS Reg. No. 3587-64-2) is particularly preferred for use as a tertiary monoalcohol, since this alcohol has a flash point of 26° C.

It is particularly preferred when the polyhydroxy component (A) has an acid value in the range from 10 to 20 mg of KOH/g.

The best results in extending pot life are achieved when 0.8 to 0.9% by weight, based on the total weight of the coating composition, of the component (C) is used. 10 to 15% by weight of the component (D) are preferably used at the same time.

The ratio of the hydroxyl groups of the polyhydroxy component (A) to the isocyanate groups of the polyisocyanate component (B) is preferably in the range from 0.5 to 2.

The coating compositions according to the invention may contain additives, such as fillers, antisettling agents and flow-out agents as well as pigments and catalysts for the polyurethane formation.

The coating compositions according to the invention may be applied to a substrate in a variety of ways, for example by brushing, spraying, flow-coating, dipping, rolling or blade-coating.

The organic solvents and the pot life extenders evaporate during or after application to the substrate.

The coatings are cured at temperatures of about 120° C. Curing time which is dependent on the temperature, on the catalyst used and of course on the binder itself, extends from a few linutes to several days. Because it is possible to use low curing temperatures, the coating compositions according to the invention are advantageously used as motor car refinishing paints.

It was particularly surprising and not foreseeable that the combination of a tertiary alcohol with basic nitrogen compounds leads to a substantially extended pot life, since tertiary amino compounds normally accelerate reaction.

In the application examples below it is shown that according to the invention the pot life of two-component polyurethane paints can be substantially extended, the extensions in pot life being of the order of magnitude of 4 hours and longer. Pot life is defined as the time during which viscosity increases by a factor of two.

Two hydroxyacrylates are used in the examples below.

Hydroxyacrylate I: caprolactone-modified acrylate
Solvent: butyl acetate/xylene (1:1)
Solids: 60.3%
Viscosity: 3.75 dPa s (50% in butyl acetate)
Acid value (solid): 19
Hydroxyl value: 98
Resin II:
Solvent: butyl acetate
Solids: 66.3%
Viscosity: 7.05 dPa s
Acid value (solid): 19
Hydroxyl value: 97

In the examples below, the polyol components I and II are mixed with polyisocyanurate-isophoronediisocyanate (brand name Desmodur Z 4370) (a) and with the reaction product from 3 mol of hexamethylene-1,6-diisocyanate with 1 mol of water (brand name Desmodur N) (b) in such a manner that the equivalent ratio is OH:NCO=1:1.

After the mixture of (C) and (D) has been added, viscosity is adjusted to 40 seconds in the DIN No. 4 cup with butyl acetate and the changes in viscosity are followed for 5 hours.

1-Methoxy-tert.-butanol-2 is used in all the examples as the tertiary alcohol.

After viscosity has been adjusted to 40 seconds (DIN No. 4 cup), the viscosity of the solutions was measured after 1, 2, 3, 4 and 5 hours. The results are shown in the diagrams of Examples 1 to 20. In those cases where viscosity measurements were terminated before 5 hours had elapsed, the samples had already gelled.

The continuous line in the diagrams of Examples 1 to 20 serves as a comparison of the current changes in viscosity of the corresponding two-component polyurethane system without the addition of the mixture of (C) and (D).

The percentages given in the Examples are based on the total weight of the coating composition.

We claim:

1. A coating composition containing an organic solvent, a mixture of a polyhydroxy component (A) and a polyisocyanate component (B), and a pot life extender, wherein the polyhydroxy component has an acid value of 5 to 25 mg of KOH/g, and a mixture consisting of 0.1 to 4.0% by weight, based on the total weight of the coating composition, of a compound having a tertiary amino group or an amide group (C), and of 1 to 15% by weight, based on the total weight of the coating composition, of a tertiary monoalcohol (D) is used as pot life extender, 2-methyl-2-propanol and 2-methyl-2-butanol being excluded as the tertiary alcohol.

2. A coating composition as claimed in claim 1 wherein the polyisocyanate component (B) has exclusively secondary isocyanate groups.

3. A coating composition as claimed in one of claims 1 and 2, wherein polyisocyanurate-polyisocyanates of isophoronediisocyanate, reaction products of 3 mol of isophoronediisocyanate with 1 mol of water or the adducts of 3 mol of isophoronediisocyanate with 1 mol of a triol are used as the polyisocyanate component (B).

4. A coating composition as claimed in one of claims 1 to 3, wherein the compound (C) is selected from the group comprising dimethylacetamide, dimethylcyclohexylamine, N-methylmorpholine, 1-methylpyrrole, methylimidazole and 1-methylpyrrolidine.

5. A coating composition as claimed in one of claims 1 to 4, wherein the tertiary monoalcohol (D) has an evaporation value below 60.

6. A coating composition as claimed in one of claims 1 to 5, wherein the tertiary monoalcohol (D) has a flash point above 21° C.

7. A coating composition as claimed in one of claims 1 to 6, wherein 1-methoxy-tert.-butanol-2 is used as the tertiary monoalcohol (D).

8. A coating composition as claimed in one of claims 1 to 7, wherein the polyhydroxy component (A) has an acid value in the range from 10 to 20 mg of KOH/g.

9. A coating composition as claimed in one of claims 1 to 8, wherein 0.8 to 0.9% by weight of the component (C) is used.

10. A process of coating a substrate comprising applying to the substrate a coating composition containing an organic solvent; a mixture of a polyhydroxy component (A) having an acid value of 5 to 25 mgs of KoH/g and a polyisocyanate component (B); and a pot life extender comprised of a mixture of 0.1 to 4% by weight, based on the total weight of the coating composition, of a compound having a tertiary amino group or an amide group (D), and 1 to 15% by weight, based on the total weight of the coating composition, of a tertiary monoalcohol (d), 2-methyl-2-propanol and 2-methyl-2-butanol being excluded as the tertiary monoalcohol.

11. The processof claim 10 wherein the polyisocyanate component (B) has exclusively secondary isocyanate groups.

12. The process of claims 10 or 11 wherein polyisocyanurate - polyisocyanates of isophorone diissocyanate, reaction products of 3 mol of isophoronediisocyanate with 1 mol of water of the adducts of 3 mol of isophorone diisocyanate with 1 mol of a triol are used as the polyiisocyanate component (B).

13. A process of claim 10 wherein compound (D) is selected from dimethylacetamide, dimethylcyclohexylamine, N-methylmorpholne, 1-methylpyrrole, methyl imidazole, and 1-methylpyrrolidine.

14. A process of claim 10 wherein the tertiary monoalcohol (D) has an evaporation value below 60.

15. A process of claim 10 wherein the tertiary monoalcohol (D) has a flash point about 21° C.

16. A process of claim 10 wherein the teriatry monoalcohol (D) is 1-methoxy-tert. butanol-2.

17. A process of claim 10 wherein the polyhydroxy component (A) has an acid value in the range of 10 to 20 mg of KOH/g.

18. A process of claim 10 wherein compound (D) comprises 0.8–0.9% of the composition by weight.

* * * * *

UNITED STATES PATENT AND TRADEMARK OFFICE
CERTIFICATE OF CORRECTION

PATENT NO. : 4,983,703
DATED : January 8, 1991
INVENTOR(S) : Dieter MÖLLER et al.

It is certified that error appears in the above-identified patent and that said Letters Patent is hereby corrected as shown below:

In Column 5, line 16, claim 10, change "group (D),..." to read --group (C),...-- line 17-18, claim 10, change "...monoalcohol (d),..." to read --..monalcohol (D),...-- line 20, claim 11, change "The processof..." to read --The process of..--

In Column 6, line 7, claim 13, change "...wherein compound (D) is" to read --...wherein compound (C) is-- line 9, claim 13, change "N-methylmorpholne," to read --N-methylmorpholine,-- line 20, claim 18, change "...wherein compound (D)" to read --...wherein compound (C)--

Signed and Sealed this

Eighteenth Day of August, 1992

Attest:

DOUGLAS B. COMER

*Attesting Officer*    *Acting Commissioner of Patents and Trademarks*